(No Model.)
W. W. HILLS & O. M. JURGENSON.
DEVICE FOR DISTRIBUTING PARIS GREEN ON PLANTS.
No. 422,782. Patented Mar. 4, 1890.
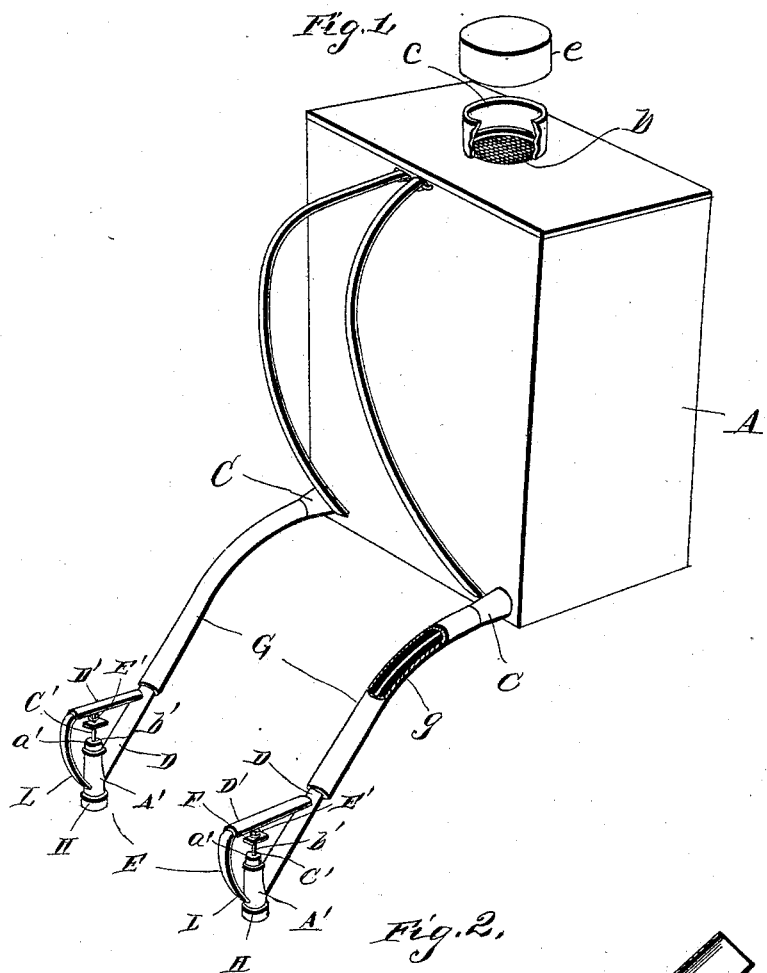
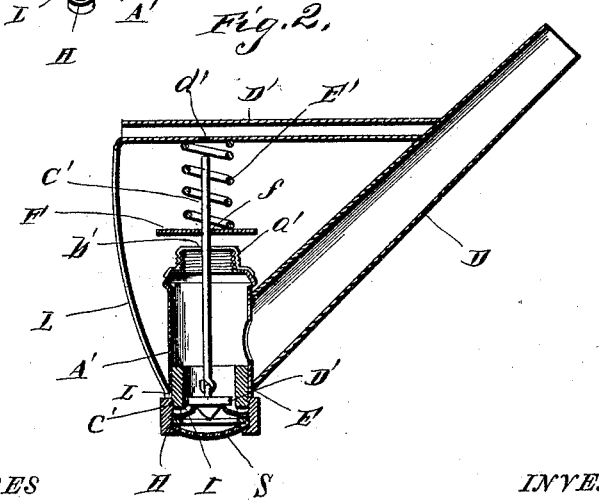
WITNESSES
INVENTORS
W. W. Hills.
O. M. Jurgenson
by E. W. Anderson Attorney

UNITED STATES PATENT OFFICE.

WILLIAM WILLIARD HILLS AND OVE MARTIN JURGENSON, OF EVANS, MICHIGAN.

DEVICE FOR DISTRIBUTING PARIS-GREEN ON PLANTS.

SPECIFICATION forming part of Letters Patent No. 422,782, dated March 4, 1890.

Application filed September 16, 1889. Serial No. 324,028. (No model.)

*To all whom it may concern:*

Be it known that we, WILLIAM WILLIARD HILLS and OVE MARTIN JURGENSON, citizens of the United States, and residents of Evans, in the county of Kent and State of Michigan, have invented certain new and useful Improvements in Devices for Distributing Paris-Green on Plants; and we do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 of the drawings is a perspective view of the invention, and Fig. 2 is a vertical section of one of the sprinklers.

This invention has relation to devices for spraying or sprinkling plants with paris-green and other poisons for exterminating potato-bugs and other vermin.

In carrying out this invention, I construct a portable tank to be suspended from the shoulders on the back of the operator, having connected therewith lateral vertical spray attachments, actuated by either hand of the tank-carrier.

In the accompanying drawings, the letter A indicates the tank or receptacle for the water and paris-green or other poison. It is usually rectangular in form, and is slung on the back of the person by straps passing over the shoulder and secured around the arms. At the top of the tank an opening $b$, having a cover $e$, is provided for filling purposes, a strainer $c$ being removably seated therein to arrest all coarse foreign substances, and in front, at each lower corner, a spout C is provided. To these spouts C C are secured similar flexible tubes or hose G G, which extend forward on either side of the operator to connect with the oblique nozzles D D of the sprinkling-cans E. An elastic supporting-wire $g$ is introduced into each tube, extending from its spout C, to prevent abrupt or angular bending of the tubes and consequently guard against cracking and rupture.

The sprinkling or spraying cans E are designed to be carried, one in each hand, and are eminently adapted, by their flexible connections with the tank, to be directed at will to the desired spot which is to be treated with the poison. They are similarly constructed, and each consists of the oblique nozzle D, connected to a vertical cylindrical chamber A′, having a cap $a'$, centrally perforated at $b'$, and an externally-threaded lower end $c'$, to receive the internally-threaded box H, containing the valve-seat I and the perforated spray-plate S. It is also provided with the horizontal handle D′, attached to and extending from the nozzle D, over the chamber A′, to a guard L, which is integral therewith and extends at an angle thereto downward to the chamber C, to the lower portion of which it is attached, as shown. This handle is perforated at $d'$, underneath, to receive the upper end of a valve-rod C′, which engages loosely therein to preserve its vertical position with relation to the chamber C. The valve-rod C′ extends downward from the handle D′, through the cap $a'$ and the chamber C, to connect loosely at its lower end with a conical valve B′.

E′ is a spiral spring surrounding the upper part of the valve-rod and interposed between the handle D′ and a broad rectangular finger-lift F, through the perforation $f$ of which the valve-rod passes and in which it is rigidly secured. The opposite ends of this spring are respectively secured to the under surface of the handle and to the top of the finger-plate F. The object of this spring device is to permit the raising and lowering of the valve to regulate the flow of liquid from the tank into the sprinkler when it is compressed and relaxed by the fingers of the operator pressing against the under side of the lift-plate. When the valve and its connections are in their normal positions, said valve rests in its seat I and prevents the outflow of liquid from the sprinkler; but as the valve is raised or depressed the liquid is accordingly ejected from the spray-plate in greater or less quantities, the conical shape of said valve operating effectively in regulating the volume of liquid passing through the seat. This regulation of the quantity of liquid passing through the sprinkler is considered of great importance, both on account of the scarcity of water in some sections and the high price of the chemical used, and also for the reason that small plants require less active treatment than the larger ones.

What we claim as new, and desire to secure by Letters Patent, is—

The portable spraying device, comprising the reservoir, the flexible connections, and the spraying-cans, their internal valves, removable sprinkler-boxes, the handles connected to oblique nozzles of the cans and to the cans, the valve-rod openings, and spring-pressed finger-pieces attached to said valve-rods under the handles, substantially as specified.

In testimony whereof we affix our signatures in presence of two witnesses.

WILLIAM WILLIARD HILLS.
OVE MARTIN JURGENSON.

Witnesses:
   H. D. JEWELL,
   E. L. PHELPS.